Sept. 24, 1963     H. T. M. RICE     3,104,657
PRIME MOVER AND GOVERNOR
Filed July 28, 1961     3 Sheets-Sheet 1
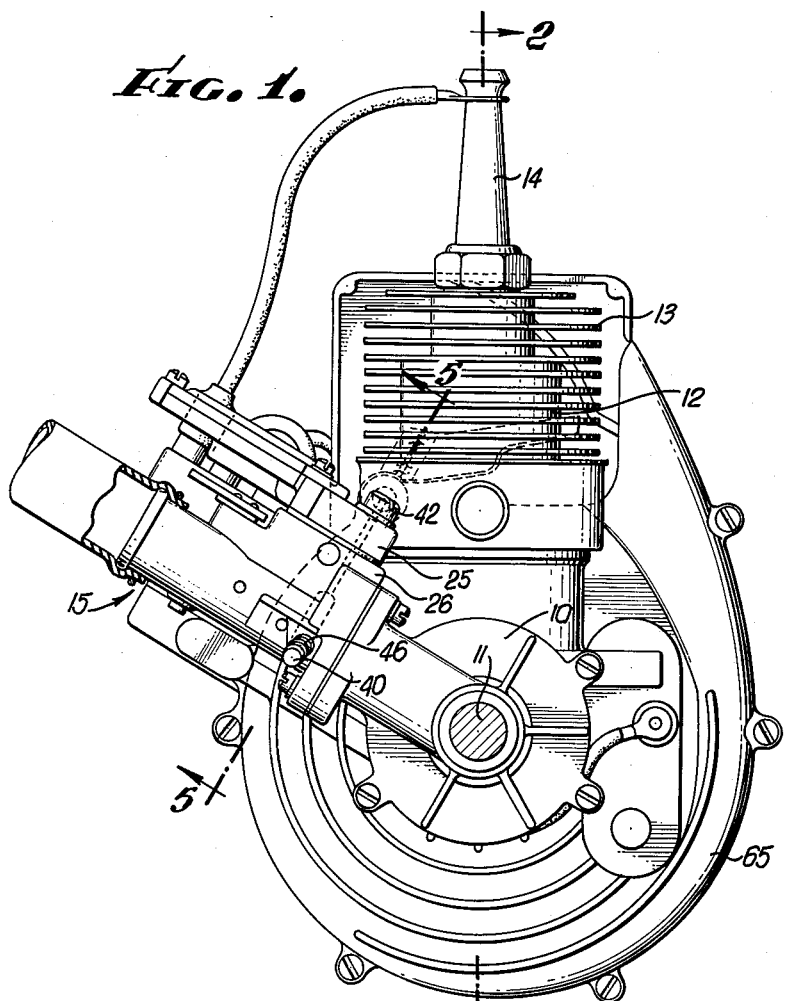
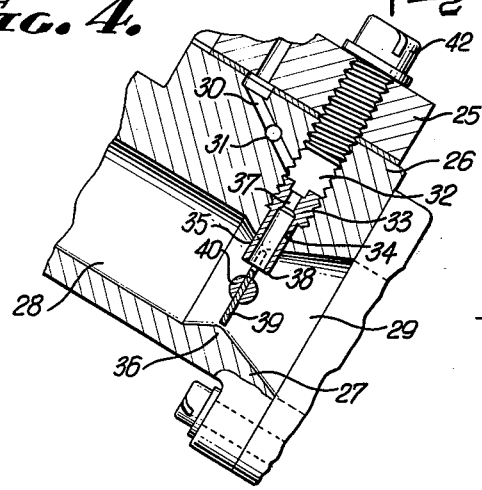
HENRY T. M. RICE
INVENTOR.
BY
Bernard Kriegel
ATTORNEY.

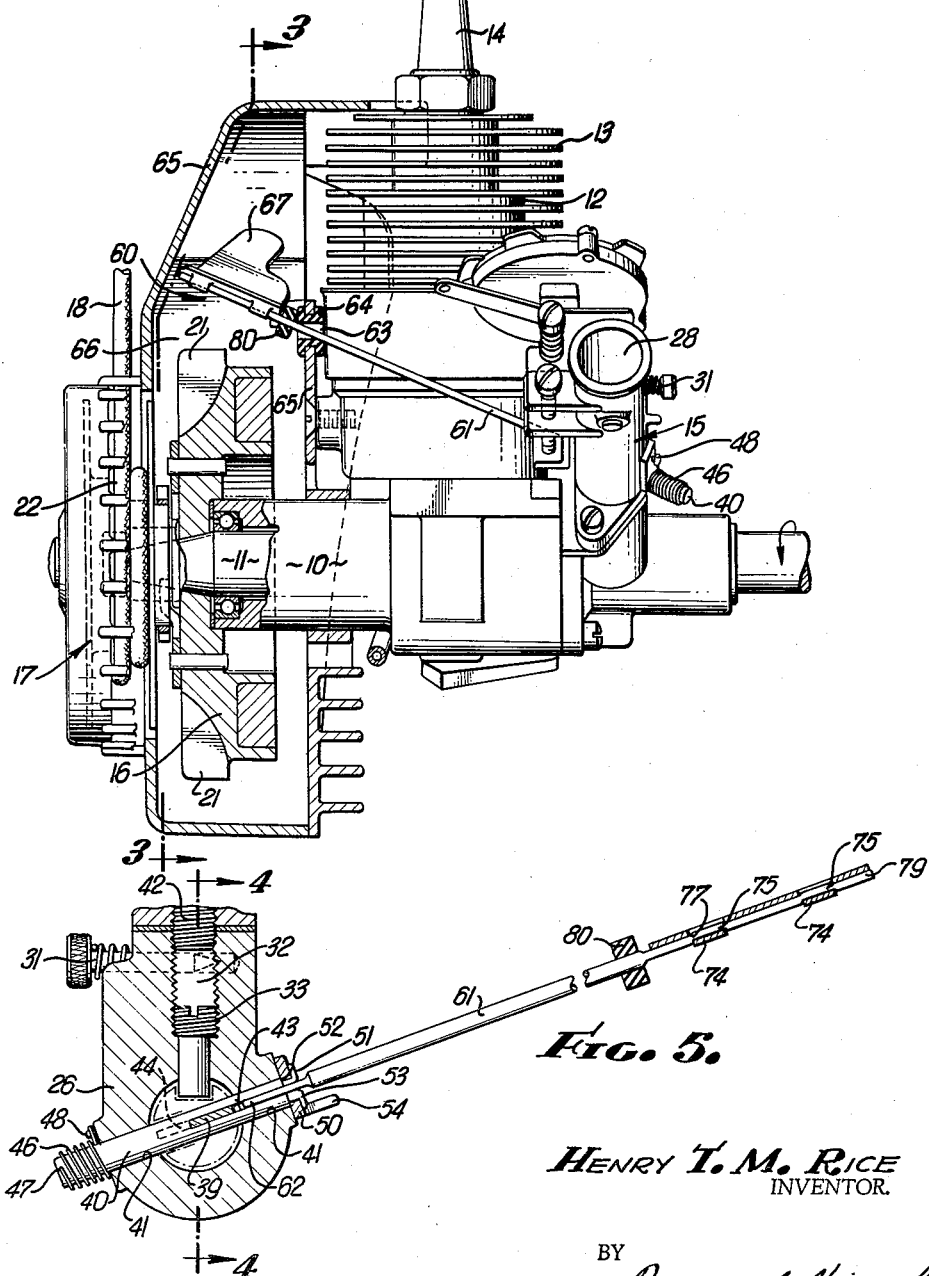

Sept. 24, 1963  H. T. M. RICE  3,104,657
PRIME MOVER AND GOVERNOR
Filed July 28, 1961  3 Sheets-Sheet 3
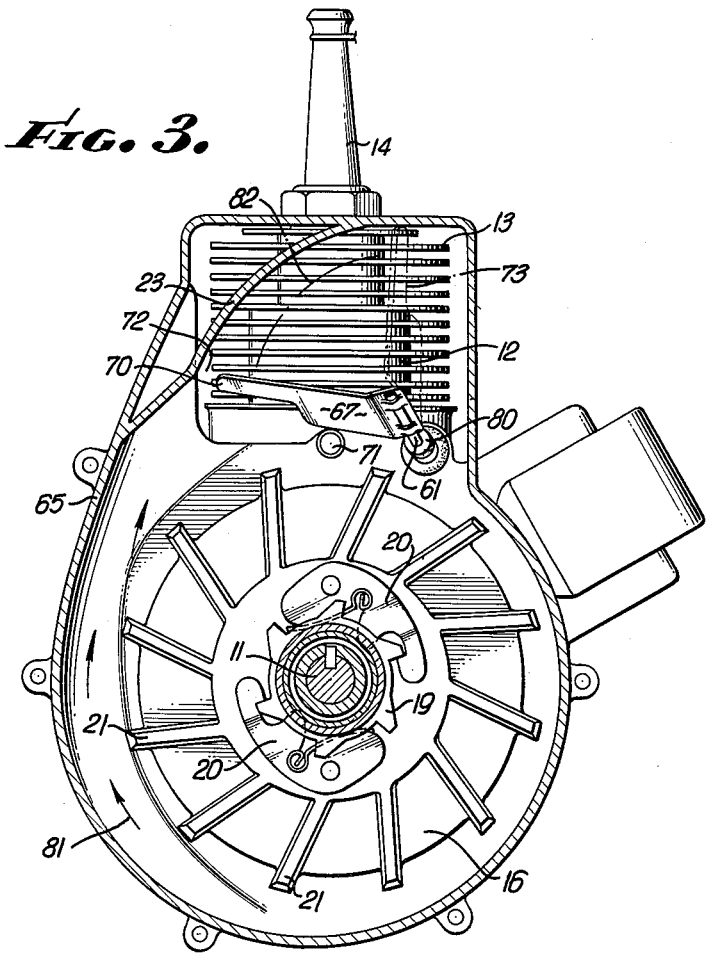
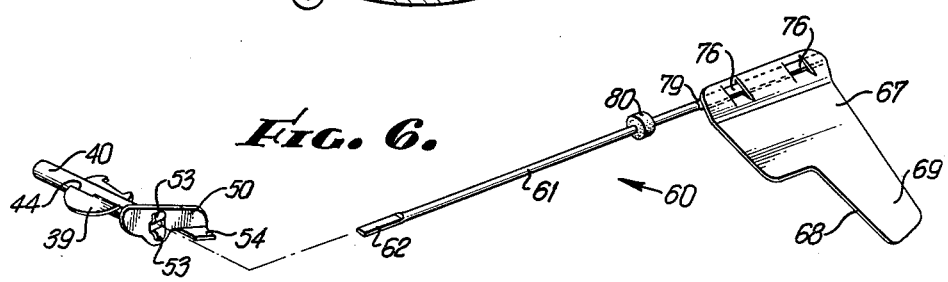
HENRY T. M. RICE
INVENTOR.
BY Bernard Kriegel
ATTORNEY.

3,104,657
PRIME MOVER AND GOVERNOR
Henry T. M. Rice, San Gabriel, Calif., assignor to Ohlsson & Rice, Inc., Los Angeles, Calif., a corporation of California
Filed July 28, 1961, Ser. No. 127,623
15 Claims. (Cl. 123—103)

The present invention relates to prime movers, such as internal combustion engines, and more particularly to prime movers controlled by governors to maintain their speeds substantially constant.

It has heretofore been difficult to properly regulate the speed of a small engine by use of a governor. A small engine has a small rotating mass, and, it is, therefore, readily subject to rapid deceleration and even stalling when large loads are applied to it suddenly. Due to the small inertia of the moving parts, the speed of the engine drops suddenly, there being insufficient opportunity for the governor to adjust the engine throttle so that adequate fuel is fed to the engine to overcome the suddenly applied load.

It is an object of the present invention to provide a governor controlled prime mover in which the governor is capable of properly regulating the speed of the prime mover when sudden load is applied, which tends to suddenly drop the speed of a prime mover of small size.

Another object of the invention is to provide a governor controlled internal combustion engine in which assurance is had that the engine will not stall when large loads are applied to it suddenly.

A further object of the invention is to provide a governor controlled internal combustion engine which will properly maintain the speed of the engine when heavy loads are applied to it suddenly, and also as the load on the engine varies, whether such load be light or heavy.

Still a further object of the invention is to provide a governor for controlling an internal combustion engine which has very few parts, being simple in construction, and coupled directly to the engine carburetor so that dirt, mud, ice, and other foreign substances, cannot interfere with proper operation of the governor.

An additional object of the invention is to provide a governor for controlling an internal combustion engine subject to vibration, in which the operation of the governor is unaffected by vibrations to which it might be subjected.

Yet another object of the invention is to provide an internal combustion engine and a governor therefor, in which the governor is simple, compact, sturdy, economical to manufacture, and possessed of a long, useful life.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is an end view of a prime mover, such as an internal combustion engine, embodying the invention;

FIG. 2 is a vertical section taken along the line 2—2 on FIG. 1, parts being shown in side elevation;

FIG. 3 is a section taken along the line 3—3 on FIG. 2;

FIG. 4 is an enlarged section through the carburetor portion of the engine;

FIG. 5 is an enlarged section taken along the line 5—5 on FIG. 1; and

FIG. 6 is an exploded isometric view of a portion of the governor and associated throttle of the apparatus illustrated in FIGS. 1 to 5, inclusive.

The prime mover illustrated in the drawings is an internal combustion engine having a suitable support or crankcase 10 in which a crankshaft 11 is rotatably mounted. This crankshaft is connected, by means of a connecting rod (not shown), to a piston (not shown) reciprocable in an engine cylinder 12, which is disclosed as being of the air-cooled type, there being fins 13 on the cylinder past which cooling air can flow. The cylinder has a spark plug 14 for igniting the charge therein, as well as a carburetor 15 to which liquid fuel is fed from a suitable source. A flywheel 16 is secured to one end of the crankshaft, which is also employed for starting the engine, there being a starter mechanism 17 having a starter pull cord 18 extending therefrom. Pulling on the starter cord rotates a ratchet wheel 19, the teeth of which engage pawls 20 pivotally mounted on the flywheel and rotor 16, to turn the crankshaft 11 and effect starting of the engine.

The flywheel or rotor 16 has suitable vanes 21 thereon, which will draw air through the air inlets 22 in the periphery of the starter housing, and discharge such air outwardly of the flywheel and along a guiding baffle 23, from where the air will flow past the cylinder 12 and its fins 13 to the surrounding atmosphere. As described hereinbelow, the air delivered by the rotor or flywheel 16 is also caused to operate upon the governor of the internal combustion engine, which maintains its speed substantially constant regardless of variations in the load applied to the crankshaft 11.

Fuel from a suitable tank (not shown) flows to a demand fuel regulator 25, the housing of which is attached to the carburetor body 26, which has a venturi portion 27 therein. This body has an inlet passage 28 for air adapted to flow into the upstream side of the venturi, admixing with fuel in the carburetor so that the air-fuel mixture passes through the venturi outlet 29 and then to the engine cylinder 12. A suitable liquid fuel flows from the regulator 25 through a fuel inlet or passage 30 controlled by an adjustable needle valve 31 threaded into the carburetor body 26. From the inlet passage, the fuel flows into a transverse bore 32 in the carburetor body, which is threaded to threadedly receive a carburetor jet or nozzle 33 projecting through an aligned bore 34 in the body, with its inner portion 35 extending partially into the throat 36 of the venturi. Fuel from the bore 32 flows through the carburetor jet passage 37 into the throat portion 36 of the carburetor. Air drawn through the carburetor body by the engine piston when on its suction stroke and through its venturi throat 36 flows past the outlet end 38 of the carburetor jet 33, drawing fuel therefrom, which admixes with the air, this mixture then passing to the engine cylinder. The quantity of air flowing is dependent upon the position of a throttle plate 39 mounted on a rod 40 rotatable in aligned bores 41 in the carburetor body and projecting in opposite direction therefrom. The threaded bore 32 in the carburetor body has its outer end closed by a suitable screw plug 42, which may also attach the demand fuel regulator 25 to the carburetor body 26.

The throttle plate 39 is fastened to the rod 40 in a relatively simple manner. As shown, the rod has a slot 43 extending inwardly from one end by a substantial distance. The slot has a width conforming to the thickness of the throttle plate 39, and the throttle plate has a notch 44 through one portion slightly wider than the diameter of the rod. Accordingly, the throttle plate 39 can be slipped into the rod 40 from the open end of its slot 43 to the fullest extent in which the base of the notch 44 engages the inner end of the slot. The throttle plate 39 is circular and has a diameter conforming to the diameter of the venturi throat 36 so that, when disposed in the position normal to the axis of the venturi, the latter is almost fully closed.

The throttle plate 39 is normally biased to an open position by a coil spring 46 encompassing an outer portion of the rod, and which has one end secured thereto, as by inserting it into a transverse hole 47 in the rod. The other end of the coil spring is secured to or bears upon a pin or projection 48 fixed to the carburetor body 26. The spring 46 tends to turn the rod 40 in a direction to open the throttle plate 39, or to remove it from the position disclosed in FIG. 4 normal to the axis of the venturi 27, and toward a position substantially inclined to the axis of the venturi, thereby allowing a greater quantity of air at a greater velocity to flow through the venturi, which will pass across the open end 38 of the carburetor nozzle 33 and create a suction therewithin, pulling liquid fuel from the jet passage 37 into the carburetor throat 36 for admixture with the air.

The rod 40 is prevented from moving endwise of the carburetor body 26 by a throttle lever 50 mounted over an end portion 51 of the rod of reduced diameter so as to provide a shoulder 52 against which the throttle lever abuts. The throttle lever 50 is secured to the rod in any suitable manner, as by outwardly flaring the ends 53 of the rod on opposite sides of its slot 43 and forcing them against the outer surface of the throttle lever, clamping the latter against the rod shoulder 52. Accordingly, the throttle lever 50 prevents endwise movement of the rod 40 in one direction, as to the left as seen in FIG. 5, by engaging the body 26; whereas, the coil spring 46 resists movement of the rod in the opposite direction.

The throttle lever may have a push pad 54 projecting therefrom against which a suitable manual operating member (not shown) may bear. When a force is exerted on the pad 54, it rocks the lever 50 and rod 40 in a direction to shift the throttle plate 39 toward the closed position, as shown in FIG. 4. Release of the force on the throttle lever 50 allows the coil spring 46 to move the rod 40 and throttle plate 39 to the full throttle opening position.

In the present instance, in addition to manually actuating the throttle lever 50 to operate the rod 40 and throttle plate 39, the latter is actuated by a speed responsive governor 60. The governor includes a governor shaft 61 disposed in alignment with the carburetor rod 40 and directly coupled thereto by inserting its flat end portion 62, which has a thickness conforming to the width of the rod slot 43, between the flared ends 53 of the rod and into such slot. The rod or shaft 61 extends across the exterior of the engine cylinder and through a bore 63 in a rubber or rubber-like grommet 64 suitably mounted in the engine frame 65 and into the blower outlet 66 at one corner portion thereof. A vane 67, which is preferably thin and light, is secured to the governor shaft 61 and extends across the blower outlet 66. This vane has an outer notch or recess 68 so that its outer portion 69 is of a reduced transverse area extending across the blower outlet. The end 70 of the vane terminates adjacent to the guiding baffle 23 extending along the housing, this guiding baffle being interiorly curved or concave so that when the vane is in a position against a stop element 71, such as a pin, suitably secured to the frame of the engine and adjacent to the rotor 16, a substantial gap 72 exists between the end of the vane and the guiding baffle. As the air forces the vane 67 in a direction away from the rotor 16, the end 70 of the vane more closely approaches the concave baffle 23. The gap 72 gradually diminishes from the full throttle opening position of the vane 67 illustrated in FIG. 3 toward the throttle plate idle position illustrated in broken lines 73 in FIG. 3, at which time the end 70 of the vane leaves substantially no gap with the adjacent guiding baffle 23. The advantage and purpose of the gradually diminishing gap 72 as the vane moves from a full throttle to a closed throttle position are set forth hereinbelow.

The vane 67 is secured to the governor shaft 61 in a comparatively simple and effective manner. Spaced tab portions 74 of the vane are punched away from the remaining body of the vane to provide openings 75 through which the rod is insertable, the rod having spaced offsets 76 at these portions, the outwardly directed offset parts extending into the recesses 77 in the vane body provided by the outward deforming of the spaced offset tabs 74. The vane tabs are received within the depressions 78 formed by the rod offset portions. Such offset portions 76 are in an end flat part 79 of the governor shaft 61, so that such end flat portion 79 makes a flat engagement with the vane 67 to couple the latter to the shaft 61 for rotation together, the companion offset portions 74, 76 preventing relative longitudinal movement of the vane and shaft 61.

Outward movement of the shaft 61 and vane 67 is prevented by their engagement with the adjacent housing 65 of the engine, preventing the inner flat part 62 of the governor shaft from being removed from the slot 43 in the carburetor rod 40. Inward movement of the shaft 61 and vane 67 is prevented by a rubber or rubber-like collar 80 mounted on the shaft 61 and engaging the rubber grommet or bushing 64, and also engageable with the inner portion of the vane 67 itself.

It is apparent from the foregoing relationship of parts that the vane 67 is attached to the governor shaft 61 in a simple and highly effective manner, and that the governor shaft is assembled or coupled directly to the carburetor rod 40 and is held in appropriate assembled relation in a simple and highly effective manner, there being a direct, in-line coupling of the governor shaft 61 to the throttle rod 40.

The rotor 16 not only serves to supply air for cooling the cylinder 12 but it also functions to appropriately position the vane 67 along the guiding baffle 23 against the resistance of the coil spring 46 to maintain the proper extent of throttle plate 39 opening, to insure that the engine operates at the desired speed. With the engine at rest, the spring 46 will have turned the rod 40 and throttle plate 39 to a full open position, which will also turn the governor shaft 61 coupled thereto and the vane 67, to place the vane against the stop pin 71, as illustrated in FIGS. 2 and 3. When the engine starts, the crankshaft 11 and rotor 16 rotate in the direction of the arrows 81 (FIG. 3), the rotor blades 21 discharging air in an outward direction against the governor vane 67 and tending to move it in the direction of the arrow 82 to correspondingly turn the governor shaft 61, throttle rod 40 and throttle plate 39 against the force of the coil spring 46. The faster the crankshaft 11 and flywheel 16 rotate, the more air at a greater velocity will be directed against the governor vane 67, tending to shift the vane in the direction of the curved arrow 82 in FIG. 3, or toward a throttle closing position.

When the vane 67 is in the full throttle opening position against the stop pin 71, there is a substantial gap 72 between the end of the vane and the guiding baffle 23 through which a substantial quantity of the air discharged by the rotor can by-pass around the vane 67. Some air will always pass through the notch or recess 68 in the vane, to assure the supply of an adequate quantity of cooling air for flowing around the cylinder fins 13 in order to cool the cylinder. With the throttle in the full open position, the engine will increase in speed, assuming the absence of an overload, and as the result of such increase in speed, the velocity of the air and the force attributable thereto is directed against the face of the vane 67, tending to shift it in an upward direction in FIG. 3, to correspondingly turn the governor shaft 61 and the throttle 39, to reduce the extent of throttle opening, against the force of the spring 46, thereby resulting in the feeding of a lesser quantity of air and fuel to the cylinder. If the speed of the engine continues to increase, as, for example, upon decrease in the load, the vane 67 will be shifted upwardly to a further extent along the guiding baffle 23. There will be a diminution in the gap 72 between the end 70 of the vane and the guiding baffle 23, so that less air by-passes around the end 70 of the vane and a greater quantity is caused to impinge upon the vane 67, to shift it in an upward direction and further close the throttle, resulting in the feeding of a decreased quantity of fuel to the engine. With the throttle plate 39 in an intermediate position, if the engine speed still tends to increase, the by-pass area around the vane is less than when the throttle is in a more fully open position. Accordingly, an increase in the speed of the engine is associated with a more ready adjustment of the vane 67 toward a throttle closing position, since less air can by-pass around the vane and more air is directed by the curved baffle 23 against the vane to shift it more readily toward the throttle closing position 73.

When the vane 67 is disposed against the stop pin 71, or in the full throttle opening position, not only is the by-pass area 72 between the end 70 of the vane and the guiding baffle 23 the greatest, so that less air acts on the baffle, but the air is attacking the vane 67 at an unfavorable angle, since the angle of attack is inclined to the vane. As a result, the air is not striking the vane directly and has less effective force for shifting the vane 67 upwardly toward the throttle closing position.

The unfavorable angle of attack of the air against the vane 67, when the latter is in the full throttle opening position, and the greater by-pass area of the gap 72 between the end 70 of the vane and the guiding baffle 23 when in such position, is availed of to insure against the stalling of the engine if large loads are applied to it suddenly. Assuming the vane 67 to be in an intermediate position, and the engine running at the proper speed, a suddenly applied load will result in the speed dropping off substantially, whereupon the vane 67 will be shifted by the spring 46 to the full throttle opening condition illustrated in FIG. 3, opening the throttle wide. The engine will pick up in speed as the result of feeding the additional required fuel to it, but such increase in speed will not be immediately effective to shift the vane 67 from its full throttle opening position. As a matter of fact, when the engine speed increases to the desired value, the amount of air delivered by the rotor 16 toward the vane 67 will still be incapable of shifting the vane to partially close the throttle. This is due to the fact that some air can by-pass through the gap 72 between the end 70 of the vane and the guiding baffle 23, and also due to the unfavorable angle of attack of the air against the vane at this time. Actually, when a load is applied suddenly, resulting in full opening of the throttle, it is necessary for the engine to increase its speed from the speed to which it has dropped to the value that the governor is designed to maintain, and then an excess speed, or overspeed, is required to deliver sufficient air to commence movement of the vane 67 toward the throttle closing position 73. Assurance is, therefore, had that the engine will pick up the large load and resume at least its proper speed before the vane 67 begins shifting toward the throttle closing position. As the speed of the engine picks up and the vane moves into the baffle region 23, the by-pass gap 72 diminishes in area, so that a greater quantity of air is striking against the vane 67 and also the angle of attack of the air against the vane, as it pivots about the axis of the governor shaft 61, is more favorable or advantageous, since the air is then striking it substantially at right angle, resulting in a more ready shifting of the vane toward the throttle closing position 73. The speed of the engine will be reduced to the proper value from its overspeed value, and will then be maintained at the desired speed by the balance reached between the force exerted by the air on the vane 67, tending to turn the governor shaft 61 and the throttle rod 40 to the throttle plate closing position, and the spring 46, which tends to move the throttle rod 40 and shaft 61 to the fully open position. In the event that the load becomes lighter and the air moves the vane 67 further away from the blower, a greater quantity of air, resulting from an increase in speed of the engine and the rotor 16, is effective to more readily shift the vane toward the throttle closing position 73. The air is guided by the curved baffle 23 substantially at right angles to the vane, more air striking the vane as the gap 72 between the vane, more air striking the vane as the gap 72 between the vane and the guiding baffle 23 decreases, as the result of movement of the vane toward the throttle plate closing position, as illustrated in broken lines in FIG. 3.

It is, accordingly, apparent that a prime mover has been provided that includes a governor capable of regulating the speed of the engine properly despite the fact that the engine may be of small size, which possesses relatively small rotating masses, and despite the sudden application of loads to the engine that will produce sudden speed drops. The sudden dropping in the engine speed is accompanied by a rapid and sudden movement of the governor vane 67 to the full throttle opening position, since, as the spring 46 shifts the vane toward such position, air is less capable of maintaining the vane in its setting at which the angle of attack of the air against the vane is more favorable, and the by-pass area 72 between the vane and the baffle is less. The governor assures the rapid regaining or reestablishment of the desired speed when the increased load is applied to it, and despite the continued application of the increase load, inasmuch as the movement of the throttle from its fully open position actually occurs only upon an overspeed of the engine from the desired speed at which it is to be maintained. As set forth above, this is due to the unfavorable angle of attack of the air against the vane when in the full throttle opening position, and the greater by-pass area 72 around the vane 67.

The governor mechanism is simple and is directly coupled to the carburetor shaft or rod 40, being in direct line therewith. This avoids intervening linkages, levers, and the like, which could be fouled by foreign matter that could interfer with operation of the governor. Instead, actual experience has shown that dirt, mud, ice, and the like, do not interfere with operation of the governor. The governor is simple and compact, the vane 67 being secured to the shaft 61 without the necessity for any other parts, and simply as the matter of appropriately offsetting portions of the vane 67 and the companion flat governor shaft portion 79. Such simplicity and compactness makes the governor arrangement economical to manufacture, while yet permitting it to be of strong and sturdy construction. Very few supporting elements are required for the governor shaft 61 since the carburetor rod or shaft 40 carries or supports the inner end 62 of the governor shaft, whereas its outer end is supported by the rubber grommet 64 and the rubber collar 80. There is, thus, a minimum of parts subject to vibration of the engine that might adversely affect its operation, and such vibration is dampened by the rubber collar 64 and the rubber grommet 80.

I claim:
1. In an internal combustion engine having a rotatable member, a combustion chamber, and a carburetor having a pivoted control device determining the supply of a combustible charge to said chamber, the combination therewith of a governor member substantially aligned with the pivotal axis of said control device and coupled directly to said control device, a fluid actuated member secured directly to said governor member, means rotated by said rotatable member for directing a fluid medium against said fluid actuated member to move said control device toward a closed position in response to increase in the speed of said rotatable member, and means for resist- ing such movement of said control device and fluid actuated member.

2. In an internal combustion engine having a rotatable member, a combustion chamber, and a carburetor having a pivoted control device determining the supply of a combustible charge to said chamber, the combination therewith of a governor member substantially aligned with the pivotal axis of said control device and coupled directly to said control device, a vane secured directly to said governor member, an impeller rotated by said rotatable member and adapted to direct air against said vane to shift said control device toward a closed position in response to increase in the speed of said rotatable member, and means for resisting such movement of said control device and vane.

3. In an internal combustion engine having a cylinder, a crankshaft, and a carburetor including a pivoted throttle member for determining the supply of a combustible charge to said cylinder, the combination therewith of a governor shaft substantially aligned with the pivotal axis of said throttle member and coupled directly to said throttle member, a vane secured directly to said governor shaft, an impeller secured to said crankshaft for directing air against said vane to turn said governor shaft and throttle member in one direction, and spring means secured to said throttle member to turn said throttle member and shaft in the opposite direction.

4. In an internal combustion engine having a cylinder, a crankshaft, and a carburetor including a pivoted throttle member for determining the supply of a combustible charge to said cylinder, the combination therewith of a governor shaft substantially aligned with the pivotal axis of said throttle member and coupled directly to said throttle member, a vane secured directly to said governor shaft, an impeller secured to said crankshaft for directing air against said vane to turn said governor shaft and throttle member in one direction, spring means secured to said throttle member to turn said throttle member and shaft in the opposite direction, baffle means adjacent to an end of said vane for guiding air supplied by said impeller against said vane, said vane being spaced substantially from said baffle means when said throttle member is in substantially full open position to allow air delivered by said impeller to by-pass partially around said vane.

5. In an internal combustion engine having a cylinder, a crankshaft, and a carburetor including a throttle member for determining the supply of a combustible charge to said cylinder, the combination therewith of a governor shaft coupled directly to said throttle member, a vane secured to said governor shaft, an impeller secured to said crankshaft for directing air against said vane to turn said governor shaft and throttle member in one direction, spring means secured to said throttle member to turn said throttle member and shaft in the opposite direction, baffle means adjacent to an end of said vane for guiding air supplied by said impeller against said vane, said vane being spaced from said baffle means when said throttle member is in substantially full open position to allow air delivered by said impeller to by-pass partially around said vane, said baffle means and vane being so arranged with respect to each other that the space between said vane and baffle means progressively decreases as said vane moves from a position corresponding to full throttle opening toward a position corresponding to throttle closing.

6. In an internal combustion engine having a cylinder, a crankshaft, and a carburetor including a pivoted throttle member for determining the quantity of a combustible charge supplied to said cylinder, the combination therewith of a governor shaft substantially aligned with the pivotal axis of said throttle member and coupled directly to said throttle member, a vane secured directly to said governor shaft, an impeller secured to said crank shaft for directing air against said vane to turn said governor shaft and throttle member in a throttle member closing direction, and means for turning said throttle member and shaft in a throttle member opening direction.

7. In an internal combustion engine having a cylinder, a crankshaft, and a carburetor including a pivoted throttle member for determining the quantity of a combustible charge supplied to said cylinder, the combination therewith of a governor shaft substantially aligned with the pivotal axis of said throttle member and coupled directly to said throttle member, a vane secured directly to said governor shaft, an impeller secured to said crankshaft for directing air against said vane to turn said governor shaft and throttle member in a throttle member closing direction, means for turning said throttle member and shaft in a throttle member opening direction, baffle means adjacent to an end of said vane for guiding air supplied by said impeller against said vane, said vane being spaced substantially from said baffle means when said throttle member is in substantially full open position to allow air delivered by said impeller to by-pass partially around said vane.

8. In an internal combustion engine having a cylinder, a crankshaft, and a carburetor including a throttle member for determining the supply of a combustible charge to said cylinder, the combination therewith of a governor shaft coupled to said throttle member, a vane secured to said governor shaft, an impeller secured to said crankshaft for directing air against said vane to turn said governor shaft and throttle member in one direction, means for turning said throttle member and shaft in the opposite direction, baffle means adjacent to an end of said vane for guiding air supplied by said impeller against said vane, said vane being spaced from said baffle means when said throttle member is in substantially full open position to allow air delivered by said impeller to by-pass partially around said vane, said baffle means and vane being so arranged with respect to each other that the space between said vane and baffle means progressively decreases as said vane moves from a position corresponding to full throttle opening toward a position corresponding to throttle closing.

9. In prime mover apparatus having a rotatable member and a pivoted control device for determining the supply of energy to the apparatus, the combination therewith of a governor member substantially aligned with the pivotal axis of said control device and connected directly to said control device, a fluid actuated member secured directly to said governor member, means rotated by said rotatable member for directing a fluid medium against said fluid actuated member to move said control device toward a closed position in response to increase in the speed of said rotatable member, and means for resisting such movement of said control device and fluid actuated member.

10. In prime mover apparatus having a rotatable member and a pivoted control device for determining the supply of energy to the apparatus, the combination therewith of a governor member substantially aligned with the pivotal axis of said control device and connected directly to said control device, a vane secured directly to said governor member, an impeller rotated by said rotatable member and adapted to direct air against said vane to shift said control device toward a closed position in response to increase in the speed of said rotatable member, and means for resisting such movement of said control device and vane.

11. In prime mover apparatus having a rotatable member and a control device for determining the quantity of energy supplied to the apparatus, the combination therewith of a governor member connected to said control device, a vane secured directly to said governor member, an impeller rotated by said rotatable member and adapted to direct air against said vane to shift said control device toward a closed position in response to increase in the speed of said rotatable member, means for resisting movement of said control device and vane, baffle means adjacent to an end of said vane for guiding air supplied by said impeller against said vane, said vane being spaced substantially from said baffle means when said control device is in substantially full open position to allow air delivered by said impeller to by-pass partially around said vane.

12. In prime mover apparatus having a rotatable member and a control device for determining the supply of energy to the apparatus, the combination therewith of a governor member connected to said control device, a vane secured to said governor member, an impeller rotated by said rotatable member and adapted to direct air against said vane to shift said control device in response to the speed of said rotatable member, means for resisting movement of said control device and vane, baffle means adjacent to an end of said vane for guiding air supplied by said impeller against said vane, said vane being spaced from said baffle means when said control device is in substantially full load position to allow air delivered by said impeller to by-pass partially around said vane, said baffle means and vane being so disposed with respect to each other that the space between said vane and baffle means progressively decreases as said vane moves from a position corresponding to full load toward a position corresponding to light load.

13. In an internal combustion engine having a cylinder, a crankshaft, and a carburetor including a throttle member for determining the quantity of a combustible charge to said cylinder and having a slot, the combination therewith of a governor shaft having an end portion inserted in said slot to couple said shaft directly to said throttle member, a vane secured directly to said governor shaft, an impeller secured to said crankshaft for directing air against said vane to turn said governor shaft and throttle member in a throttle member closing direction, and means for turning said throttle member and governor shaft in a throttle member opening direction.

14. In prime mover apparatus having a rotatable member and a control device for determining the supply of air to the apparatus, said control device having a slot, the combination therewith of a governor shaft having an end portion inserted in said slot to couple said shaft directly to said throttle member, a vane secured directly to said governor shaft, an impeller secured to said rotatable member for directing air against said vane to turn said governor shaft and control device in one direction toward a closed position as the impeller speed increases, and means for turning said control device and governor shaft in the opposite direction.

15. In an internal combustion engine having a cylinder, a crankshaft, and a carburetor including a pivoted throttle member for determining the supply of a combustible charge to said cylinder, the combination therewith of a governor shaft substantially aligned with the pivotal axis of said throttle member and coupled directly to said throttle member, a vane secured directly to said governor shaft, an impeller secured to said crankshaft for directing air against said vane to turn said governor shaft and throttle member toward throttle closing position, and spring means for turning said throttle member and shaft toward full throttle opening position.

References Cited in the file of this patent

UNITED STATES PATENTS

| | | |
|---|---|---|
| 1,639,265 | Miller | Aug. 16, 1927 |
| 1,660,079 | Mack | Feb. 21, 1928 |
| 1,917,790 | Baumann | July 11, 1933 |
| 2,525,602 | Jackson | Oct. 10, 1950 |
| 2,548,334 | Armstrong | Apr. 10, 1951 |
| 2,836,159 | Morden | May 27, 1958 |